United States Patent
Thakolsri et al.

(10) Patent No.: US 11,653,395 B2
(45) Date of Patent: May 16, 2023

(54) METHOD FOR ESTABLISHING A CONNECTION OF A MOBILE TERMINAL TO A MOBILE RADIO COMMUNICATION NETWORK AND RADIO ACCESS NETWORK COMPONENT

(71) Applicant: NTT DOCOMO, INC., Tokyo (JP)

(72) Inventors: Srisakul Thakolsri, Munich (DE); Malla Reddy Sama, Munich (DE); Irfan Ali, Palo Alto, CA (US); Atsushi Minokuchi, Tokyo (JP); Takuya Shimojo, Tokyo (JP); Alf Zugenmaier, Munich (DE)

(73) Assignee: NTT DOCOMO, INC., Tokyo (JP)

( * ) Notice: Subject to any disclaimer, the term of this patent is extended or adjusted under 35 U.S.C. 154(b) by 793 days.

(21) Appl. No.: 16/341,548

(22) PCT Filed: Oct. 4, 2017

(86) PCT No.: PCT/EP2017/075206
§ 371 (c)(1),
(2) Date: Apr. 12, 2019

(87) PCT Pub. No.: WO2018/069115
PCT Pub. Date: Apr. 19, 2018

(65) Prior Publication Data
US 2021/0378032 A1    Dec. 2, 2021

(30) Foreign Application Priority Data

Oct. 14, 2016  (EP) .................................. 16193989

(51) Int. Cl.
*H04W 76/10* (2018.01)
*H04W 12/037* (2021.01)
*H04W 76/12* (2018.01)

(52) U.S. Cl.
CPC ......... *H04W 76/10* (2018.02); *H04W 12/037* (2021.01); *H04W 76/12* (2018.02)

(58) Field of Classification Search
CPC .... H04W 76/10; H04W 76/12; H04W 12/037
See application file for complete search history.

(56) References Cited

U.S. PATENT DOCUMENTS

2011/0176530 A1   7/2011  Vikberg et al.
2012/0294236 A1*  11/2012 Watfa ..................... H04W 72/04
                                                      370/328

(Continued)

FOREIGN PATENT DOCUMENTS

WO    2016111566 A1   7/2016
WO    2016146219 A1   9/2016

OTHER PUBLICATIONS

Office Action issued in the counterpart European Patent Application No. 16193989.7, dated Jul. 12, 2018 (5 pages).

(Continued)

*Primary Examiner* — Redentor Pasia
(74) *Attorney, Agent, or Firm* — Osha Bergman Watanabe & Burton LLP

(57) ABSTRACT

According to one embodiment, a method for establishing a connection of a mobile terminal to a mobile radio communication network is described comprising a radio access network of a mobile radio communication network receiving a connection request from a mobile terminal, the radio access network establishing a control plane communication having as a first endpoint the radio access network, the radio access network forwarding the mobile terminal's connection request to a first common control plane function via the control plane communication, the radio access network receiving a message indicating that the second endpoint of the control plane communication should be set to the second common control plane function and the radio access network (Continued)

setting the second endpoint of the control plane communication to the second common control plane function.

15 Claims, 13 Drawing Sheets

(56) References Cited

U.S. PATENT DOCUMENTS

| | | | | |
|---|---|---|---|---|
| 2013/0303088 | A1* | 11/2013 | Watfa | H04W 4/80 |
| | | | | 455/41.2 |
| 2014/0304777 | A1* | 10/2014 | Lehtovirta | H04W 4/70 |
| | | | | 726/3 |
| 2016/0050601 | A1* | 2/2016 | Jeong | H04W 76/12 |
| | | | | 455/436 |
| 2016/0262068 | A1* | 9/2016 | Won | H04L 67/12 |
| 2017/0331671 | A1* | 11/2017 | Olsson | H04L 41/40 |
| 2017/0339609 | A1* | 11/2017 | Youn | H04W 76/11 |
| 2017/0374542 | A1* | 12/2017 | Ryu | H04W 8/08 |
| 2017/0374613 | A1* | 12/2017 | Ianev | H04W 40/04 |
| 2018/0035399 | A1* | 2/2018 | Xu | H04W 60/04 |
| 2018/0077744 | A1* | 3/2018 | Ianev | H04W 76/12 |
| 2018/0249318 | A1* | 8/2018 | Ianev | H04W 76/14 |
| 2018/0295497 | A1* | 10/2018 | Kim | H04W 8/08 |
| 2019/0058997 | A1* | 2/2019 | Futaki | H04W 16/02 |
| 2019/0158360 | A1* | 5/2019 | Xu | H04W 24/10 |
| 2019/0208401 | A1* | 7/2019 | Wiehe | H04W 8/08 |
| 2019/0230726 | A1* | 7/2019 | Jin | H04W 76/27 |
| 2019/0387393 | A1* | 12/2019 | Xu | H04W 8/08 |
| 2021/0014663 | A1* | 1/2021 | Ianev | H04W 76/14 |

OTHER PUBLICATIONS

Office Action issued in the counterpart Japanese Patent Application No. 2017554875, dated Oct. 30, 2018 (5 pages).
Written Opinion issued for PCT/EP2017/075206, dated Dec. 8, 2017 (5 pages).
3GPP TR 23.707 V13.0.0; "3rd Generation Partnership Project; Technical Specification Group Services and System Aspects; Architecture Enhancements for Dedicated Core Networks; Stage 2 (Release 13)"; Dec. 2014 (40 pages).
NTT DOCOMO, Inc.; "Dedicated Core Network (DECOR) overview and RAN3 specification impact"; 3GPP TSG-RAN3#89 R3-151607; Aug. 24-28, 2015, Beijing, China (6 pages).
Extended European Search Report issued in the counterpart European Patent Application No. 16193989.7, dated Apr. 11, 2017 (9 pages).
Office Action in counterpart European Patent Application No. 16193989.7 dated Sep. 5, 2019 (4 pages).
Office Action issued in the counterpart Indian Patent Application No. 201917014550, dated Nov. 16, 2021 (5 pages).
Office Action issued in Chinese Application No. 201780062355.5; dated Oct. 27, 2022 (18 pages).

* cited by examiner

METHOD FOR ESTABLISHING A CONNECTION OF A MOBILE TERMINAL TO A MOBILE RADIO COMMUNICATION NETWORK AND RADIO ACCESS NETWORK COMPONENT

The present disclosure relates to methods for establishing a connection of a mobile terminal to a mobile radio communication network and radio access network components.

In a mobile communication network, it typically occurs that UE (user equipment) authentication is performed after a reroute of an attach request of the UE from one common CP (control plane) function (e.g. MME, mobility management entity) to another common CP function which is in charge of the UE, e.g. based on the UE's subscription (e.g. based on a UE Type, Dedicated Core Network ID (DCN-ID), Client-ID, Customer-ID, Tenant-ID). The other common CP function (referred to as dedicated common CP function) may then perform UE authentication and/or NAS security setup.

Efficient approaches for session management between the UE and the common CP functions, in particular in the above scenario including a forwarding of an attach request from one common CP function to another common CP function, are desirable.

According to one embodiment, a method for establishing a connection of a mobile terminal to a mobile radio communication network is provided comprising a radio access network of a mobile radio communication network receiving a connection request from a mobile terminal, the radio access network establishing a control plane communication having as a first endpoint the radio access network, the radio access network forwarding the mobile terminal's connection request to a first common control plane function via the control plane communication, the radio access network receiving a message indicating that the second endpoint of the control plane communication should be set to the second common control plane function and the radio access network setting the second endpoint of the control plane communication to the second common control plane function.

According to a further embodiment, a radio access network component according to the method for establishing a connection of a mobile terminal to a mobile radio communication network described above is provided.

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

The following detailed description refers to the accompanying drawings that show, by way of illustration, specific details and aspects of this disclosure in which the invention may be practiced. Other aspects may be utilized and structural, logical, and electrical changes may be made without departing from the scope of the invention as defined by the appended set of claims. The various aspects of this disclosure are not necessarily mutually exclusive, as some aspects of this disclosure can be combined with one or more other aspects of this disclosure to form new aspects.

Figure 1:
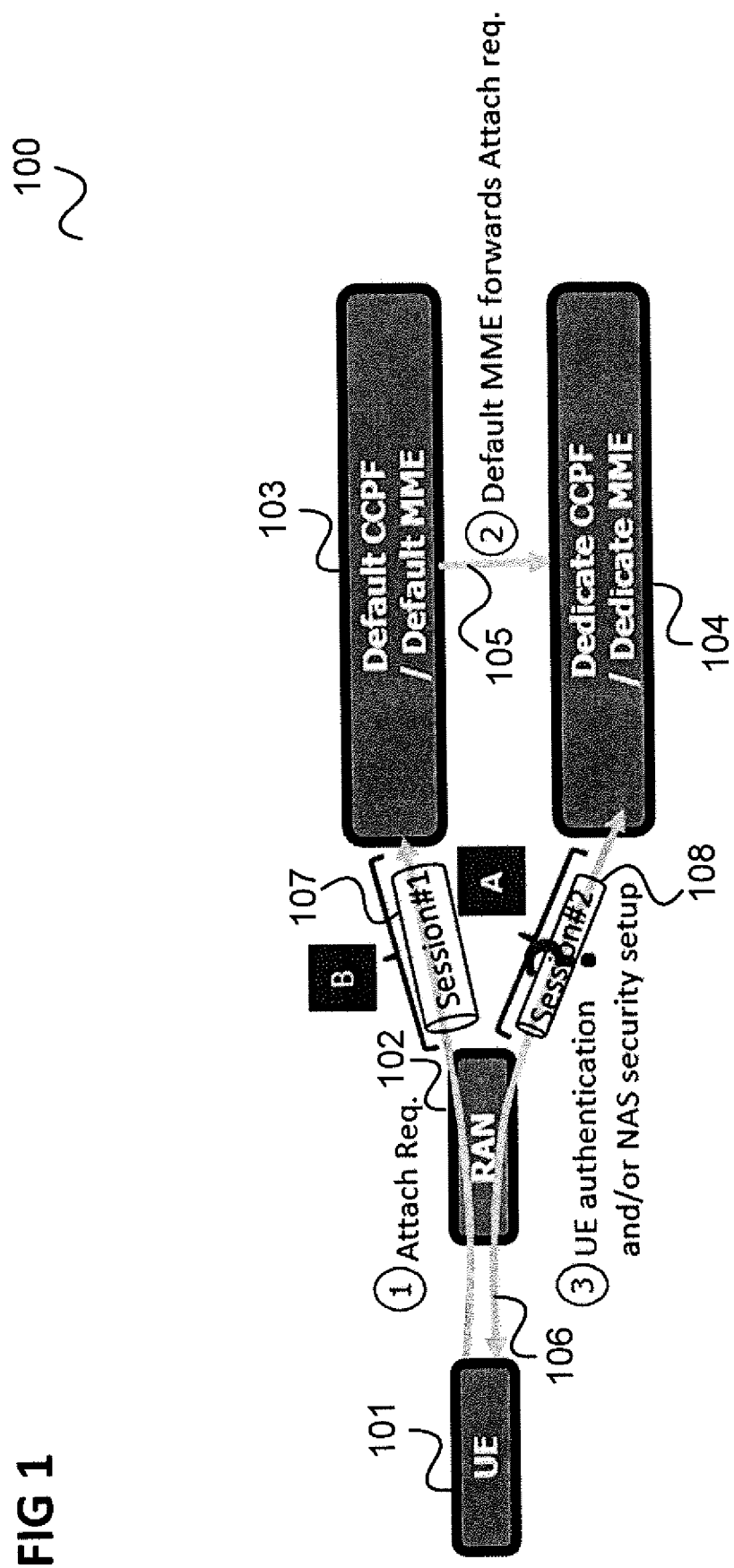
FIG. 1 illustrates the forwarding of an attach request of a UE (user equipment).

FIG. 1 illustrates the forwarding of an attach request of a UE (user equipment).

It is assumed that a UE 101 sends an attach request to a mobile communication network, specifically to the mobile communication network's radio access network (RAN) 102. The RAN 102 forwards the attach request to a default common CP function (CCPF, e.g. a default MME) 103 which may however not be responsible for the UE 101, e.g. because of the UE's subscription (e.g., UE type, Dedicated Core Network ID (DCN-ID), Client-ID, Customer-ID, Tenant-ID).

Examples of UE type are, "Machine Type Communication (MTC) UE Type", "Smartphone UE type", etc. The UE type is typically stored as a part of UE's subscription.

Therefore, the default common CP function 103 transmits the attach request to a dedicated common CP function (e.g. dedicated MME) 104 (as illustrated by a first arrow 105) which performs the UE authentication and NAS (Non Access Stratum) security setup (as illustrated by a second arrow 106). Note that in case that the default common CP function 103 has performed the UE authentication, the dedicated common CP function 104 only performs the NAS security setup.

The dedicated CCPF 104 performs authentication and security setup (or other actions such as user plane session establishment) via a second RAN-CN I/F CP session 108.

Therefore, the issue arises how to manage the RAN-CN I/F CP (radio access network-core network interface control plane) sessions if the dedicated CCPF would like to perform UE authentication and/or NAS security setup (or other actions) after receiving the attach Request forwarded by the default CCPF 103.

The RAN-CN I/F CP session management includes
A: establishing a RAN-CN I/F CP session (second session 108) between the dedicated CCPF and the RAN.
B: releasing a RAN-CN I/F CP session (first session 107) between the default CCPF and the RAN.
C: updating a RAN-CN I/F CP session (e.g. a first session 107) between the default CCPF and the RAN such that it becomes a RAN-CN I/F CP session (second session 108) without performing establishing and releasing as mentioned in the point A and point B above.

Figure 2:
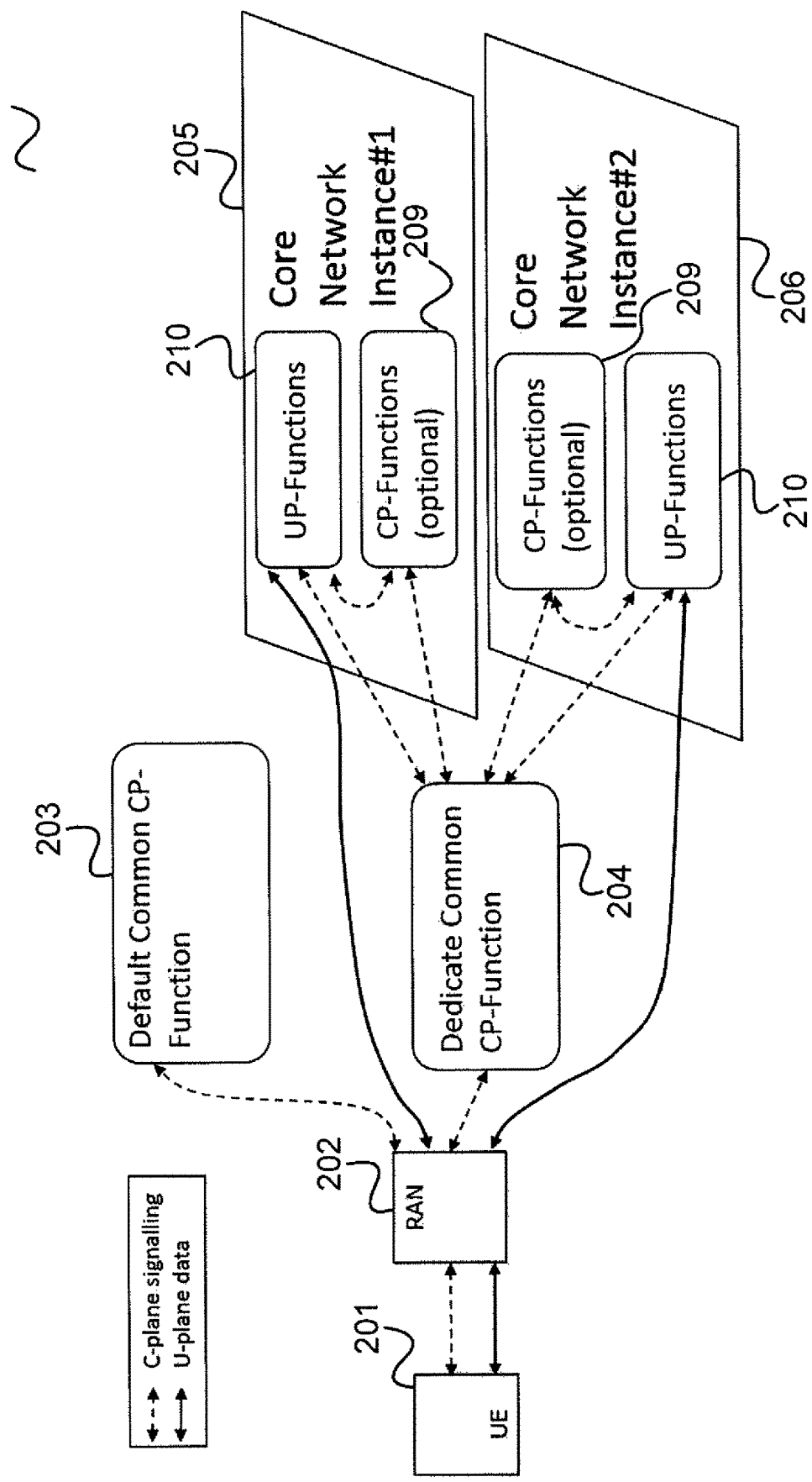
FIG. 2 shows a 5G communication system.

The above issue may for example arise in a 5G communication system as illustrated in FIG. 2.

FIG. 2 shows a 5G communication system 200.

The communication system 200 includes a UE 201 which may communicate with a 5G RAN 202 which is connected to a default common CP function 203 and a dedicated common CP function 204 specific for a first core network instance (CNI, also referred to as network slice or network slice instance) 205 and a second core network instance (CNI) 206. Depending on the network configuration, the scope of CNI may cover the dedicated common CP function.

The core network instances 205 and 206 comprise user plane functions 209 and (optionally) control plane functions 210.

The common CP functions may for example comprise authentication functionality, mobility management functionality, a common CP selection function (CCPSF) and a network slice selection function, a NAS signalling routing function, (optionally) a session management function.

The (default or the dedicated) common CP functions 203, 204 are located in the communication system's core network and are considered as entry points for the UE to access the core network (CN). In case there is not sufficient information in an initial Attach message sent by the UE 201, the default common CP function 203 is considered as a the first contact point in the CN.

Figure 3:
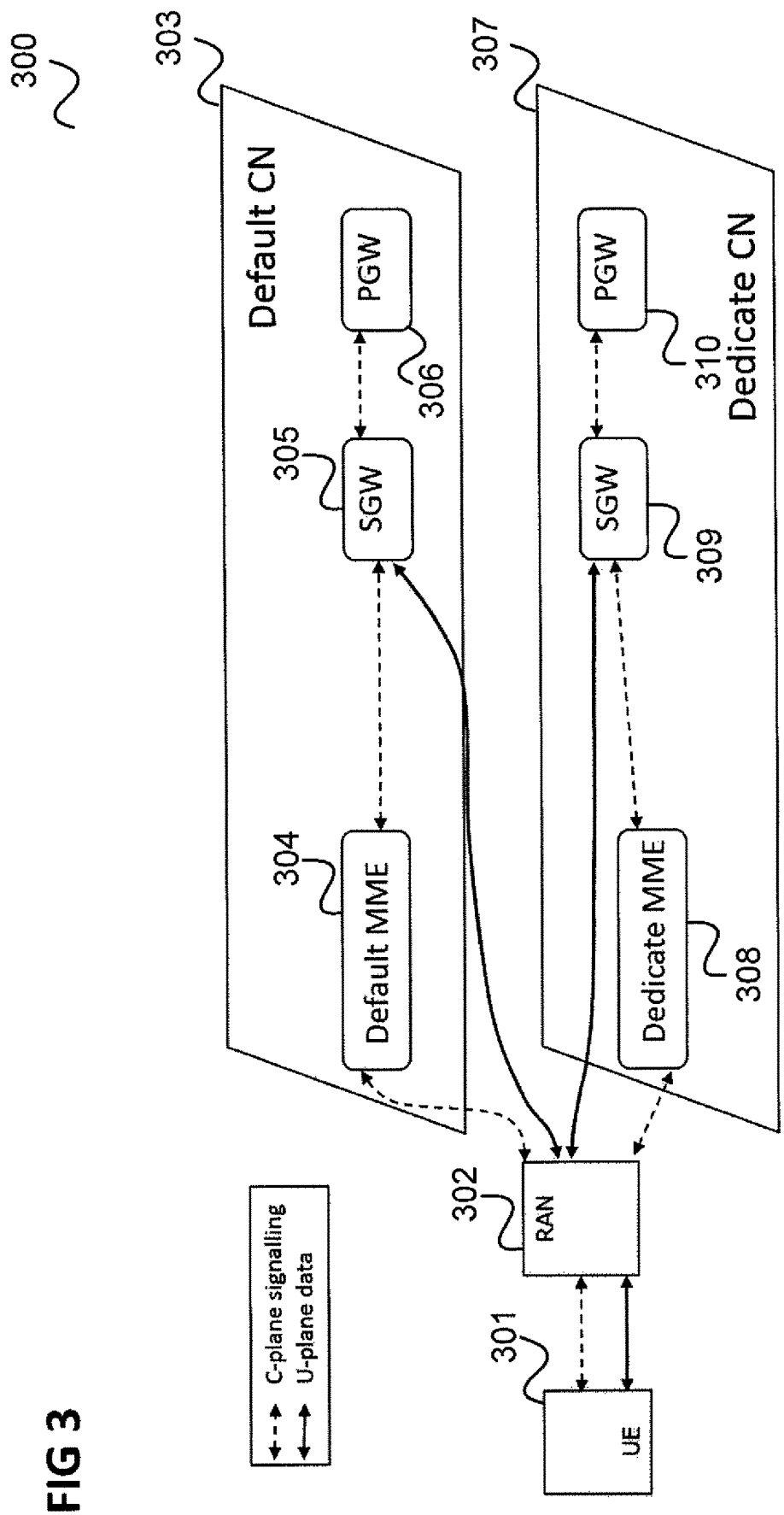
FIG. 3 shows a communication system with an EPC (Evolved Packet Core)-like architecture.

As another example, a communication system 300 with an EPC (Evolved Packet Core)-like architecture is illustrated in FIG. 3.

FIG. 3 shows a communication system 300.

The communication system 300 includes a UE 301 which may communicate with a RAN (e.g. an E-UTRAN (Evolved UMTS Terrestrial Radio Access Network)) 302 which is connected to a default core network 303 comprising a default MME 304, an first Serving Gateway 305 and a first Packet Gateway 306 and to a dedicated core network comprising a dedicated MME 308, a second Serving Gateway 309 and a second Packet Gateway 310.

The (default/dedicated) MME 304, 308 is considered as an entry point for the UE 301 to access the respective core network 303, 307. In case there is not sufficient information in an initial attach message from the UE 301 the default MME 304 is considered as the first contact point in the (overall) core network for the UE 301.

Figure 4:
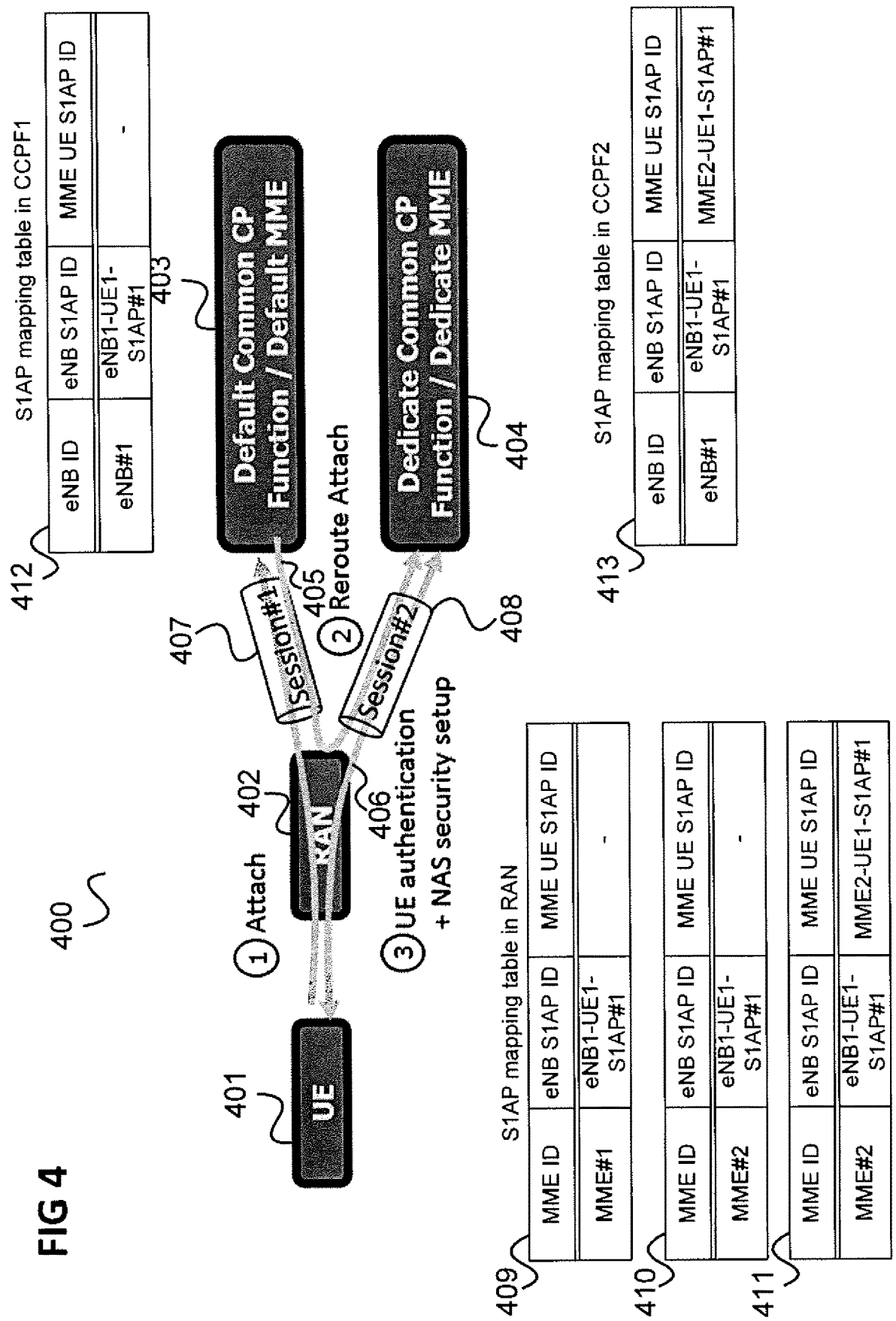
FIG. 4 illustrates an initial attach procedure with a rerouting of an attach request via the RAN.

FIG. 4 illustrates an initial attach procedure with a rerouting of an attach request via the RAN.

Similarly to FIG. 1, it is assumed that a UE 401 sends an attach request to a mobile communication network, specifically to the mobile communication network's radio access network (RAN) 402. The RAN 402 forwards the attach request to a default common CP function (default CCPF, e.g. a default MME) 403 which may however not be responsible for the UE 401, e.g. because of the UE's subscription (e.g., UE type, Dedicated Core Network ID (DCN-ID), Client-ID, Customer-ID, Tenant-ID).

Therefore, the default common CP function 403 reroutes the attach request to a dedicated common CP function (e.g. dedicated MME) 404 (as illustrated by a first arrow 405) which performs the UE authentication and NAS (Non Access Stratum) security setup (as illustrated by a second arrow 406).

The radio access network 402 transmits the attach request to the default common CP function (CCPF) via a first RAN-CN I/F CP session 407 (between the RAN 402 and the default CCPF 403) and the default CCPF 403 reroutes the attach request via the first RAN-CN I/F CP session 407, the RAN and a second RAN-CN I/F CP session 408 (between the RAN 402 and the dedicated CCPF 404) and the dedicated CCPF 404 performs the authentication and/or NAS security setup (or other actions such as user plane session establishment) via the second RAN-CN I/F CP session 408.

The sessions 407, 408 are for example established via an S1AP (S1 Application Protocol) interface. In FIG. 4 (and in the figures that follow where applicable) S1AP mapping tables for the RAN and the CCPFs are shown. Each entry of a mapping table corresponds to a S1AP session and identifies its endpoints. It should be noted that in the S1AP mapping tables shown in FIG. 4 (and the following tables) the first column (MME-ID and eNB ID, respectively) is optional. The reason is that the second and the third column of the tables anyway specify by themselves to which MME and eNB the respective S1AP session (i.e. CP session between the RAN and the CCPF/MME) is established. Hence, there may be no necessity to have the first column in the mapping table.

It should be noted that as used herein, a control plane communication that the RAN performs for a UE (comprising the forwarding of control plane, e.g. NAS messages) may use a communication session, e.g. an S1AP session. The session used may change to change the endpoint to of the control plane communication.

At the time of the transmission of the attach request from the RAN 402 to the default CCPF 403 via the first session 407 the S1AP mapping table in the RAN 402 has a first RAN table state 409 and the S1AP mapping table in the first CCPF 403 has a CCPF1 table state 412.

At the time of the transmission of the attach request from the RAN 402 to the dedicated CCPF 404 via the second session 408 the S1AP mapping table in the RAN 402 has a second RAN table state 410.

At the time of the UE authentication and NAS security setup the S1AP mapping table in the second CCPF 404 has a CCPF2 table state 413 and the S1AP mapping table in the RAN 402 has a third RAN table state 411.

Figure 5:
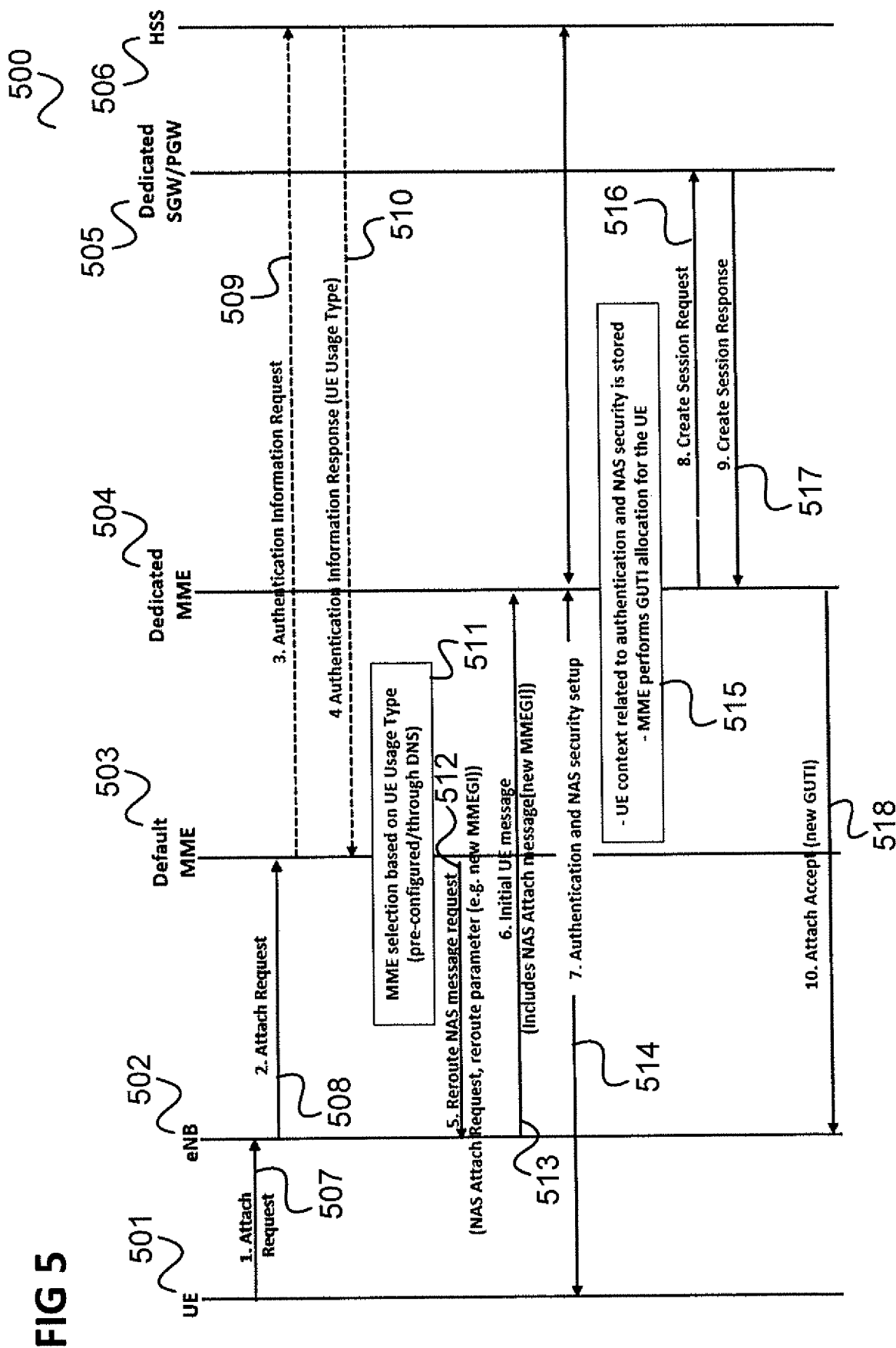
FIG. 5 shows a message flow diagram illustrating an attach procedure an initial attach procedure with a rerouting of an attach request via the RAN in more detail.

FIG. 5 shows a message flow diagram 500 illustrating an attach procedure an initial attach procedure with a rerouting of an attach request via the RAN in more detail.

The message flow takes place between a UE 501 corresponding to the UE 301, an eNB 502 corresponding to the eNB serving UE 301, a default MME 503 corresponding to the default CCPF 304, a dedicated MME 504 corresponding to the dedicated CCPF 308, a dedicated SGW or Packet Data Gateway PGW 505 corresponding to the SGW 309 or the PGW 310 and an HSS 506 of the communication network comprising core networks 303, 307 and RAN 302.

In 507, the UE 501 sends an attach request to the eNB 502.

In 508, the eNB 502 forwards the attach request to the default MME 503.

In 509, the default MME 503 sends an authentication information request to the HSS 506. However, no actual authentication is performed, the authentication information request only serves to get the UE's subscription profile from the HSS 506. This profile includes but not limited to, for example, UE usage type (i.e. the UE type as described above) or dedicated Core Network ID, enterprise ID, client ID, tenant-ID, customer-ID.

In 510, the HSS sends an authentication information response (including for example, the UE usage type, dedicated Core Network ID, enterprise ID, client ID, tenant-ID, customer-ID.) to the default MME 503.

In 511, the default MME 503 performs an MME selection based on for example, the UE usage type, dedicated Core Network ID, enterprise ID, client ID, tenant-ID, customer-ID. Such selection can be performed either by using the pre-configuration available at the default MME 503 or through a domain name server. The default MME 503 then sends, in 512, a reroute NAS message request to the eNB 502 which may include a NAS attach request and a reroute parameter (e.g. an MME group identifier MMEGI identifying the rerouting target).

In 513, the eNB 502 sends the initial UE attach request message to the dedicated MME 504 (assumed to be the target of the rerouting) which may include the NAS attach message and the MMEGI.

In 514, the dedicated MME 504 performs both authentication and NAS security setup with the UE (involving the HSS 506). The NAS security setup includes the negotiation of a key (other than the authentication key) to be used for secure communication between the dedicated MME and the UE.

In 515, the dedicated MME 504 stores UE context related to the authentication and the NAS security setup and performs GUTI (globally unique temporary identifier) allocation for the UE 501.

In 516, the dedicated MME 504 sends a create session request to the SGW/PGW 505 which is answered in 517.

In 518, the dedicated MME 504 sends an attach accept message (including the GUTI) to the eNB 502 and further parts of the attach procedure may then follow but are not described here.

It should be noted that the approach illustrated in FIGS. 4 and 5 introduces signalling and delay due to redirection signalling of the attach message via the RAN 402.

Figure 6:
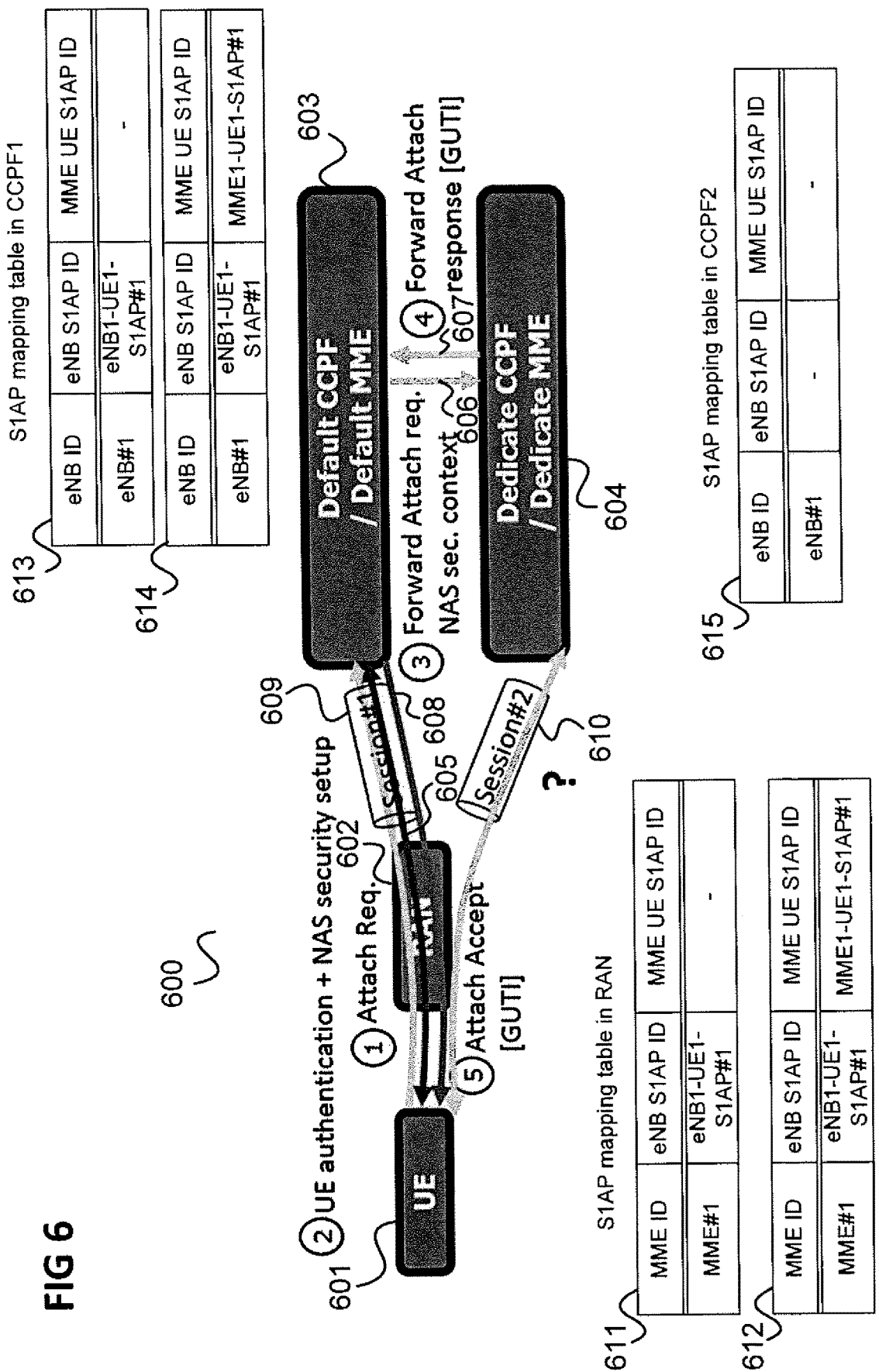
FIG. 6 illustrates an initial attach procedure with a direct forwarding of an attach request from the default CCPF to the dedicated CCPF.

FIG. 6 illustrates an initial attach procedure with a direct forwarding of an attach request from the default CCPF to the dedicated CCPF.

Similarly to FIG. 4, it is assumed that a UE 601 sends an attach request to a mobile communication network, specifically to the mobile communication network's radio access network (RAN) 602.

The RAN 602 forwards the attach request to a default common CP function (e.g. a default MME) 603.

The default CCPF 604 in this example performs the UE authentication and NAS security setup (as illustrated by a first arrow 605).

However, the default CCPF 604 may not be responsible for the UE 601, e.g. because of the UE's subscription (e.g., UE type, Dedicated Core Network ID (DCN-ID), Client-ID, Customer-ID, Tenant-ID).

Therefore, the default common CP function 603 directly sends the attach request to a dedicated common CP function (e.g. dedicated MME) 604 (as illustrated by a second arrow 606).

The dedicated CCPF 604 sends a response, that is a "Forward Attach response", (including a GUTI (globally unique temporary identifier) for the UE 601 to the default CCPF 604 (as illustrated by a third arrow 607) for forwarding to the UE 601. The default CCPF 603 forwards the attach response (i.e. attach accept) to the UE 601 (as illustrated by fourth arrow 608).

The communication between the radio access network 602 and the default common CP function (CCPF) is performed via a first RAN-CN I/F CP session 609

After transmission of the attach accept to the UE 601 a second RAN-CN I/F CP session 610 is established between the RAN 602 and the dedicated CCPF 604, e.g. for setting up a user plane communication session for the UE 601.

The sessions 609, 610 are for example established via an S1AP (S1 Application Protocol) interface.

At the time of the transmission of the attach request from the RAN 602 to the default CCPF 603 via the first session 609 the S1AP mapping table in the RAN 602 has a first RAN table state 611 and the S1AP mapping table in the first CCPF 603 has a first CCPF1 table state 613.

At the time of the authentication and NAS security setup the S1AP mapping table in the RAN 602 has a second RAN table state 612 and the S1AP mapping table in the first CCPF 603 has a second CCPF1 table state 614.

At the time of the forwarding of the attach request from the default CCPF 603 to the dedicated CCPF 604 the second CCPF 604 (e.g., dedicated CCPF) has a CCPF2 table state 615.

In the following, an embodiment is described which includes setting up a S1AP session directly between the RAN and the dedicated CCPF right after receiving the forwarded attach request from the default CCPF with reference to FIG. 7.

Figure 7:
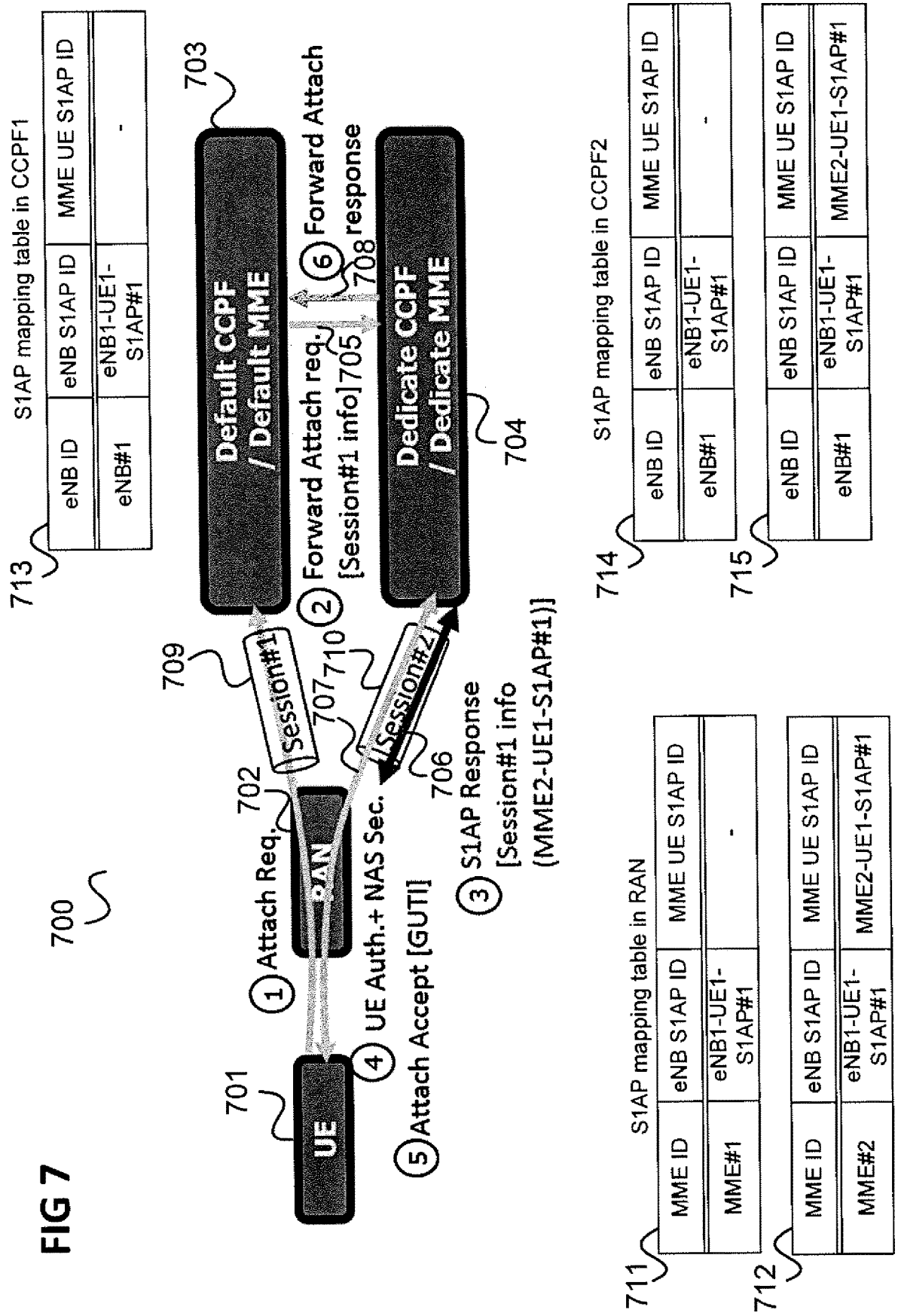
FIG. 7 illustrates an initial attach procedure according to an embodiment.

FIG. 7 illustrates an initial attach procedure.

Similarly to FIG. 4, it is assumed that a UE 701 sends an attach request to a mobile communication network, specifically to the mobile communication network's radio access network (RAN) 702.

The RAN 702 forwards the attach request to a default common CP function (e.g. a default MME) 703.

The communication between the radio access network 702 and the default common CP function (CCPF) 703 is performed via a first RAN-CN I/F CP session 709.

However, the default CCPF 704 may not be responsible for the UE 701, e.g. because of the UE's subscription (e.g., UE type, Dedicated Core Network ID (DCN-ID), Client-ID, Customer-ID, Tenant-ID).

Therefore, the default common CP function 703 directly sends the attach request to a dedicated common CP function (e.g. dedicated MME) 704 (as illustrated by a first arrow 705). The default common CP function 703 includes information about the first session 709 (e.g., specifies that the first endpoint is the radio access network) in this signalling.

The dedicated CCPF 704 then sends an S1AP response to the RAN 702 (as illustrated by a second arrow 706) including the information about the first session 709 (e.g., specifies that the first endpoint is the radio access network) and an identification of the dedicated CCPF 704, which is for example, the dedicated CCPF ID (dedicated MME ID) and/or the second endpoint of the control plane communication to the dedicated CCPF.

As a result, a second RAN-CN I/F CP session 710 is established between the RAN 702 and the dedicated CCPF The dedicated CCPF 704 then performs authentication of the UE 701 and NAS security setup for the UE 701 over the second session 710 and sends an attach accept (indicating the UE's GUTI) to the UE 701 (as illustrated by a third arrow 707). It is to be noted that in the S1AP response to the RAN 702, this S1AP response may include a NAS message that is used to perform the authentication of the UE 701. In other words, this S1AP response does not have to be a response exclusively for S1AP protocol, but can piggyback another NAS message for other usage like the authentication of the UE 701.

Additionally, the dedicated CCPF 704 sends a response to the forwarding of the attach request to the default CCPF 703 (as illustrated by a fourth arrow 708).

Further actions may performed via the second session 701, e.g. setting up a user plane communication session for the UE 701.

The sessions 709, 710 are for example established via an S1AP (S1 Application Protocol) interface.

At the time of the transmission of the attach request from the RAN 702 to the default CCPF 703 via the first session 709 the S1AP mapping table in the RAN 702 has a first RAN table state 711 and the S1AP mapping table in the first CCPF 703 has a first CCPF1 table state 713.

At the time of the forwarding of the attach request from the default CCPF 703 to the dedicated CCPF 704 the S1AP mapping table in the second CCPF 704 has a first CCPF2 table state 714.

At the time of the transmission of the S1AP response to the RAN 702 the S1AP mapping table in the second CCPF 704 has a second CCPF2 table state 715 and in reaction to the reception of the S1AP response by the RAN 702 the S1AP mapping table in the RAN 702 changes to a second RAN table state 712.

When the default CCPF 703 receives the response (e.g., Forward Attach response) from the dedicate CCPF, the UE context in the first CCPF 703 (default CCPF) is then removed for the UE 701.

The default CCPF 703 uses the forwarding of the attach request to convey the information about the first session 709 to the dedicated CCPF 704 (e.g. dedicated MME) to allow the dedicated CCPF 704 to reuse the existing S1AP session 709 (as second session 710) without creating a new session.

The transmission of the information of the first session and the identification of the dedicated CCPF 704 from the dedicated CCPF 704 to the RAN 702 may be performed via a newly introduced signalling (e.g. a newly defined message) or using an existing S1AP message to enable the RAN 702 to update the first session 709 with a new CCPF (e.g. MME) contact point.

It should be noted that UE authentication and/or NAS security setup can be done before the transmission of the information of the first session and the identification of the dedicated CCPF 704 from the dedicated CCPF 704 to the RAN 702.

Figure 8:
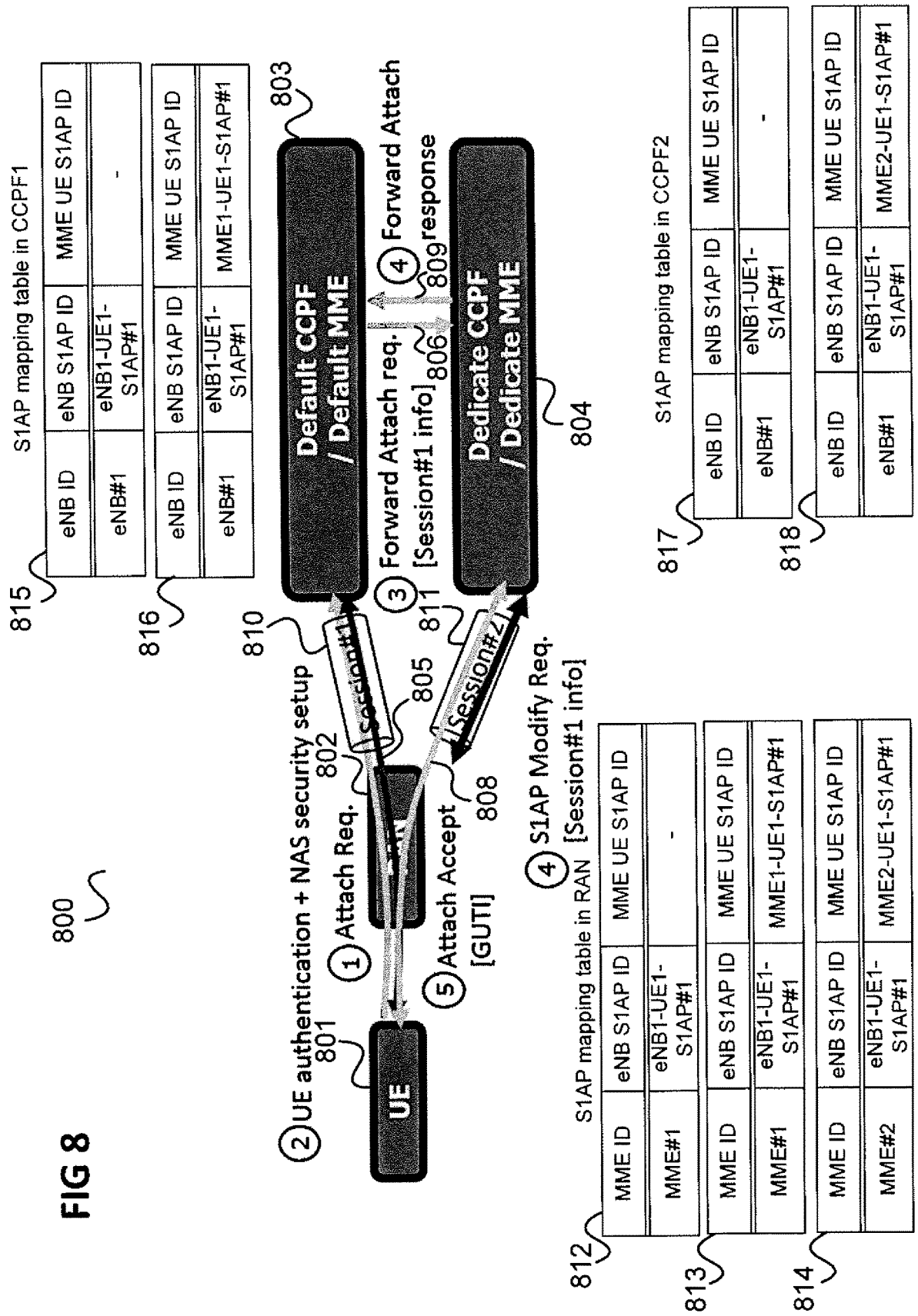
FIG. 8 illustrates an initial attach procedure according to another embodiment.

FIG. 8 illustrates an initial attach procedure according to another example.

Similarly to FIG. 7, it is assumed that a UE 801 sends an attach request to a mobile communication network, specifically to the mobile communication network's radio access network (RAN) 802.

The RAN 802 forwards the attach request to a default common CP function (e.g. a default MME) 803.

The communication between the radio access network 802 and the default common CP function (CCPF) is performed via a first RAN-CN I/F CP session 810.

In this example, the default CCPF performs authentication and NAS security setup for the UE 801 (as illustrated by a first arrow 805).

However, the default CCPF 804 may not be responsible for the UE 801, e.g. because of the UE's subscription (e.g., UE type, Dedicated Core Network ID (DCN-ID), Client-ID, Customer-ID, Tenant-ID).

Therefore, the default common CP function 803 directly sends the attach request to a dedicated common CP function (e.g. dedicated MME) 804 (as illustrated by a second arrow 806). The default common CP function 803 includes information about the first session 810 in this signalling.

The dedicated CCPF 804 then sends an S1AP modify request to the RAN 802 (as illustrated by a third arrow 807) including the information about the first session 810.

As a result, a second RAN-CN I/F CP session 811 is established between the RAN 802 and the dedicated CCPF The dedicated CCPF 804 then sends an attach accept (indicating the UE's GUTI) to the UE 801 over the second session 811 (as illustrated by a fourth arrow 808).

Additionally, the dedicated CCPF 804 sends a response to the forwarding of the attach request to the default CCPF 803 (as illustrated by a fifth arrow 809).

Further actions may performed via the second session 801, e.g. setting up a user plane communication session for the UE 801 (e.g. to another UE).

The sessions 810, 811 are for example established via an S1AP (S1 Application Protocol) interface.

At the time of the transmission of the attach request from the RAN 802 to the default CCPF 803 via the first session 810 the S1AP mapping table in the RAN 802 has a first RAN table state 812 and the S1AP mapping table in the first CCPF 803 has a first CCPF1 table state 815.

At the time of the authentication and NAS security setup the S1AP mapping table in the RAN 802 has a second RAN table state 813 and the S1AP mapping table in the first CCPF 803 has a second CCPF1 table state 816.

At the time of the forwarding of the attach request from the default CCPF 803 to the dedicated CCPF 804 the S1AP mapping table in the second CCPF 804 has a first CCPF2 table state 817.

In reaction to the reception of the S1AP modify request by the RAN 802 the S1AP mapping table in the RAN 802 changes to a third RAN table state 814 and the S1AP mapping table in the second CCPF 804 has a second CCPF2 table state 818.

The default CCPF 803 uses the forwarding of the attach request to convey the information about the first session 810 to the dedicated CCPF 804 (e.g. dedicated MME) to allow the dedicated CCPF 804 to reuse the existing S1AP session 810 (as second session 811) without creating a new session.

The transmission of the information of the first session and the identification of the dedicated CCPF 804 from the dedicated CCPF 804 to the RAN 802 enables the RAN 802 to update the first session 810 with a new CCPF (e.g. MME) contact point.

The transmission of the information of the first session and the identification of the dedicated CCPF 804 from the dedicated CCPF 804 to the RAN 802 may be performed via a newly introduced signalling (e.g. a newly defined message) or using an existing S1AP message to enable the RAN 802 to update the first session 810 with a new CCPF (e.g. MME) contact point.

It should be noted that UE authentication and/or NAS security setup can be done after the transmission of the information of the first session and the identification of the dedicated CCPF 804 from the dedicated CCPF 804 to the RAN 802. This may result in a different order of updating.

Figure 9:
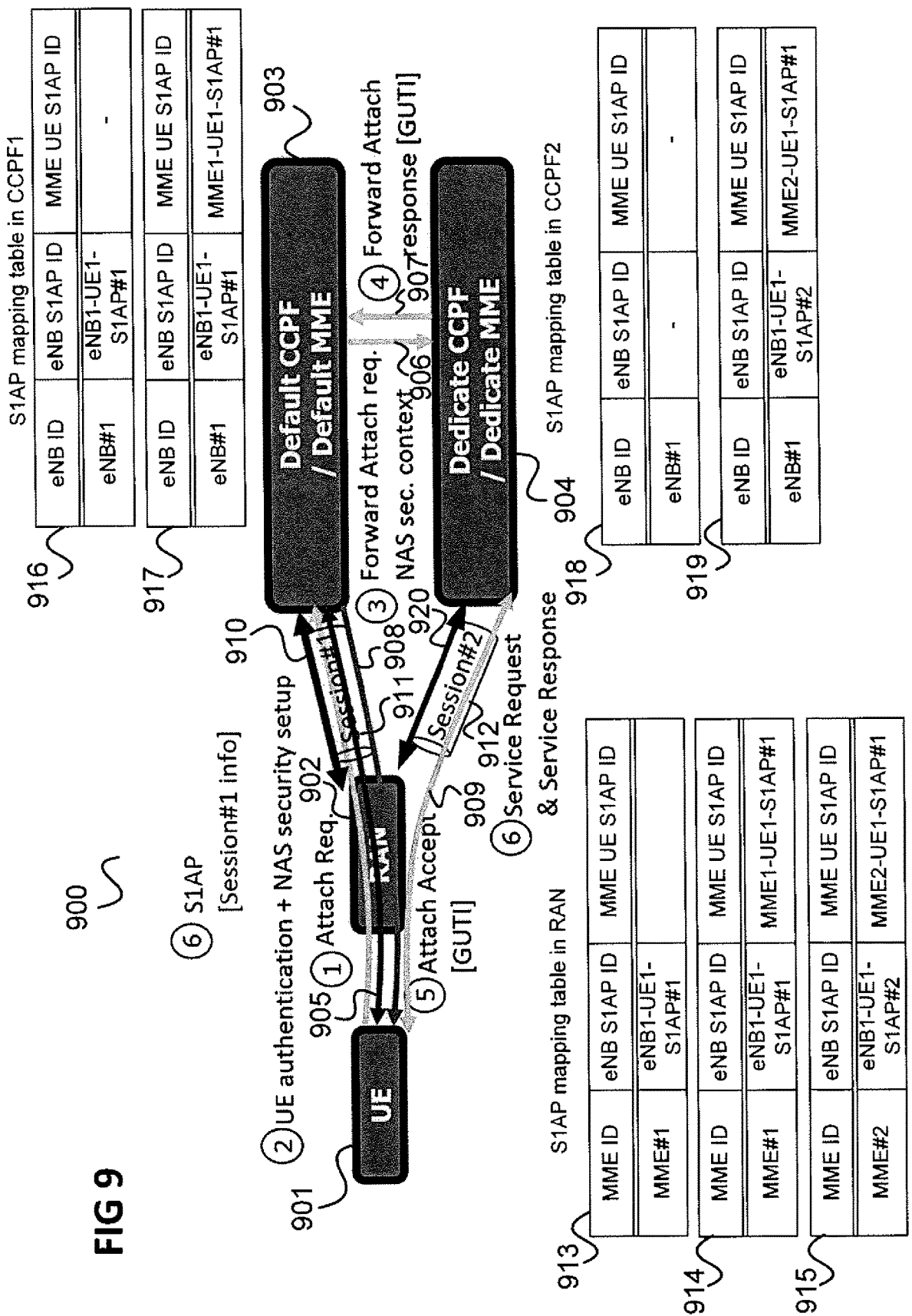
FIG. 9 illustrates an initial attach procedure according to a further embodiment.

FIG. 9 illustrates an initial attach procedure according to a further example.

Similarly to FIG. 7, it is assumed that a UE 901 sends an attach request to a mobile communication network, specifically to the mobile communication network's radio access network (RAN) 902.

The RAN 902 forwards the attach request to a default common CP function (e.g. a default MME) 903.

The communication between the radio access network 902 and the default common CP function (CCPF) is performed via a first RAN-CN I/F CP session 911.

In this example, the default CCPF performs authentication and NAS security setup for the UE 901 (as illustrated by a first arrow 905).

However, the default CCPF 904 may not be responsible for the UE 901, e.g. because of the UE's subscription (e.g., UE type, Dedicated Core Network ID (DCN-ID), Client-ID, Customer-ID, Tenant-ID).

Therefore, the default common CP function 903 directly sends the attach request to a dedicated common CP function (e.g. dedicated MME) 904 (as illustrated by a second arrow 906). The default common CP function 903 may include information about the UE's authentication and NAS security context in this signalling.

The dedicated CCPF 904 responds to the forwarding of the attach request message (as illustrated by a third arrow 907) wherein the response includes the GUTI of the UE 901.

The default CCPF 903 then transmits an attach accept including the GUTI via the RAN 902 to the UE 901 (as illustrated by a fourth arrow 908). When the RAN 902 receives a S1AP message from the default CCPF 903 that is used to piggyback the NAS attach accept from the default CCPF 903, this S1AP message contains an information indicating the RAN 902 about the change of the endpoint of the first session 910 at the CN side, which was set earlier to the endpoint of a default CCPF 903, to the endpoint of a dedicated CCPF 904. Such indication can be done by several approaches, for example, 1) S1AP message simply contains a new CN's side endpoint of a dedicated CCPF 904 and the identity of the dedicated CCPF, 2) S1AP message still contains the old endpoint of a default CCPF 903, but there is new parameters indicating about change of the CN's side endpoint of the first session 910. For the second approach, the S1AP message may be an existing S1AP protocol message type or a new S1AP protocol message type.

The RAN 902 then releases the first RAN-CN I/F CP session 911 (as illustrated by a sixth arrow 910) and set up the second RAN-CN I/F CP session 912 (as illustrated by a seventh arrow 920).

The UE 901 and the dedicated CCPF 904 may then exchange NAS messages, for example a service request and a service response (as illustrated by a fifth arrow 909).

The sessions 911, 912 are for example established via an S1AP (S1 Application Protocol) interface.

At the time of the transmission of the attach request from the RAN 902 to the default CCPF 903 via the first session 909 the S1AP mapping table in the RAN 902 has a first RAN table state 913 and the S1AP mapping table in the first CCPF 903 has a first CCPF1 table state 916.

After performing UE authentication and NAS security setup the S1AP mapping table in the RAN 902 has a second RAN table state 914 and the S1AP mapping table in the first CCPF 903 has a second CCPF1 table state 917.

At the time of the forwarding of the attach request from the default CCPF 903 to the dedicated CCPF 904 the S1AP mapping table in the second CCPF 904 has a first CCPF2 table state 918.

At the time of the RAN then releases the first RAN-CN I/F CP session 911 (as illustrated by a sixth arrow 910) and set up the second RAN-CN I/F CP session 912 (as illustrated by a seventh arrow 920), the S1AP mapping table in the RAN 902 has a third RAN table state 915, and the S1AP mapping table in the second CCPF 904 has a second CCPF2 table state 919.

Figure 10:
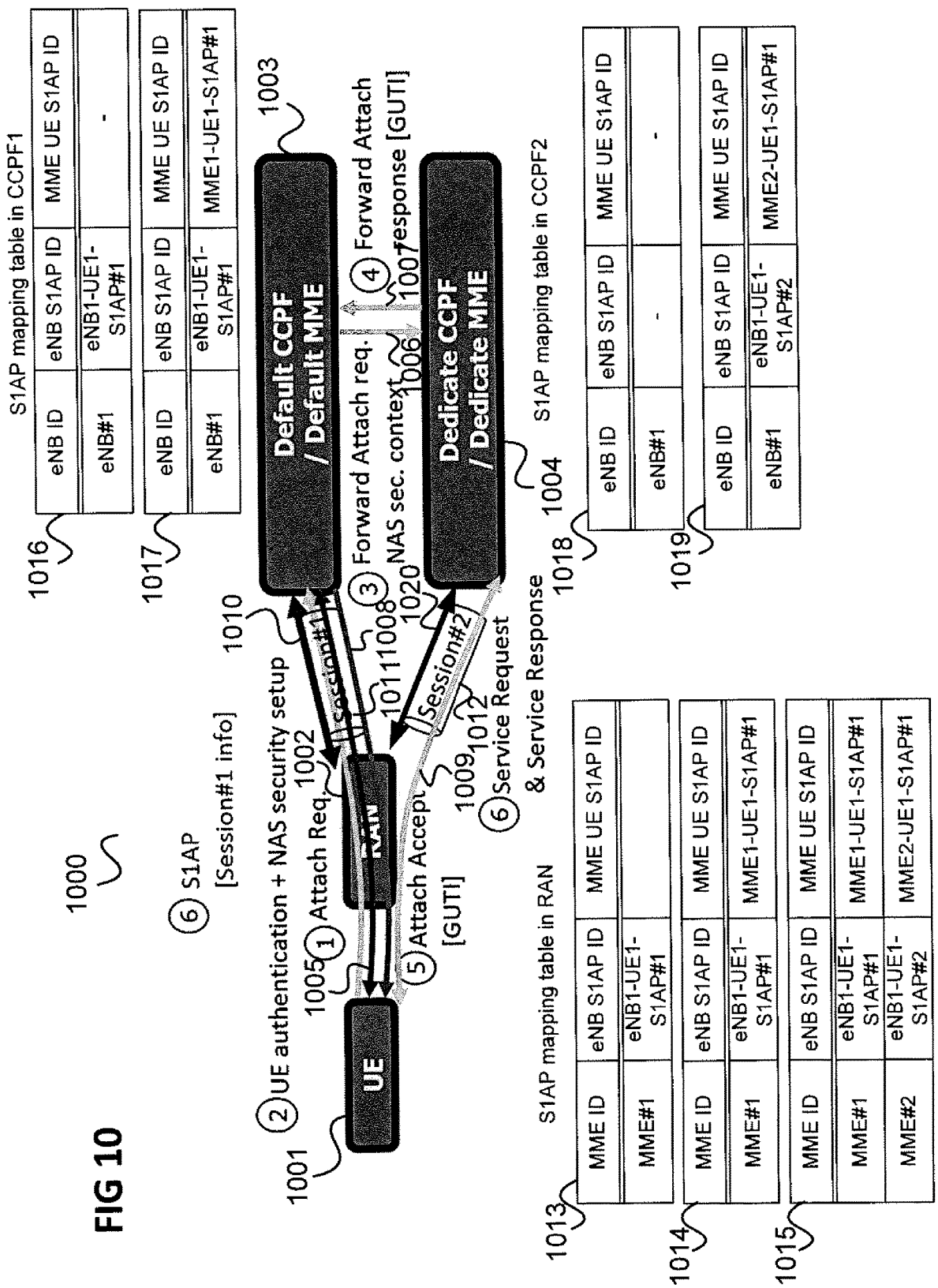
FIG. 10 illustrates an initial attach procedure according to a further second example.

FIG. 10 illustrates an initial attach procedure according to a further second example.

Similarly to FIG. 7, it is assumed that a UE 1001 sends an attach request to a mobile communication network, specifically to the mobile communication network's radio access network (RAN) 1002. The RAN 1002 forwards the attach request to a default common CP function (e.g. a default MME) 1003.

The communication between the radio access network 1002 and the default common CP function (CCPF) is performed via a first RAN-CN I/F CP session 1011.

In this example, the default CCPF performs authentication and NAS security setup for the UE 1001 (as illustrated by a first arrow 1005).

However, the default CCPF 1004 may not be responsible for the UE 1001, e.g. because of the UE's subscription (e.g., UE type, Dedicated Core Network ID (DCN-ID), Client-ID, Customer-ID, Tenant-ID).

Therefore, the default common CP function 1003 directly sends the attach request to a dedicated common CP function (e.g. dedicated MME) 1004 (as illustrated by a second arrow 1006). The default common CP function 903 may include information about the UE's authentication and NAS security context in this signalling.

The dedicated CCPF 1004 responds to the forwarding of the attach request message (as illustrated by a third arrow 1007) wherein the response includes the GUTI of the UE 1001.

The default CCPF 1003 then transmits an attach accept including the GUTI via the RAN 1002 to the UE 1001 (as illustrated by a fourth arrow 1008).

The UE 1001 and the dedicated CCPF 1004 may then exchange NAS messages, for example a service request and a service response (as illustrated by a fifth arrow 1009). When sending a service request, the UE 1001 sends the GUTI in a RRC layer message to the RAN 1002 to allow the RAN to route NAS messages (e.g. a service response) to the dedicated CCPF 1004.

The RAN 1002 then releases the first RAN-CN I/F CP session 1011 (as illustrated by a sixth arrow 1010) and set up the second RAN-CN I/F CP session 1012. For setting up the second RAN-CN I/F CP session 1012, it can be done either using the existing S1AP signalling message to convey the NAS service request (as illustrated by a fifth arrow 1009) or (optionally) an explicit S1AP signalling (as illustrated by a seventh arrow 1020).

The sessions 1011, 1012 are for example established via an S1AP (S1 Application Protocol) interface.

At the time of the transmission of the attach request from the RAN 1002 to the default CCPF 1003 via the first session 1009 the S1AP mapping table in the RAN 1002 has a first RAN table state 1013 and the S1AP mapping table in the first CCPF 1003 has a first CCPF1 table state 1016.

After performing UE authentication and NAS security setup the S1AP mapping table in the RAN 1002 has a second RAN table state 1014 and the S1AP mapping table in the first CCPF 1003 has a second CCPF1 table state 1017.

At the time of the forwarding of the attach request from the default CCPF 1003 to the dedicated CCPF 1004 the S1AP mapping table in the second CCPF 1004 has a first CCPF2 table state 1018.

At the time of the transmission of the service request sent by the UE to the dedicated CCPF, the S1AP mapping table in the RAN 1002 has a third RAN table state 1015, and the S1AP mapping table in the second CCPF 1004 has a second CCPF2 table state 1019.

Alternatively, it should be noted that instead of the third RAN table state 1015 containing two entries (one for the first session 1011 (first row) and one of the second session 1012 (second row)) there may be only a single entry like the second RAN table state 712 of the example of FIG. 7. If this second RAN table state 712 of the example of FIG. 7 applies, the S1AP mapping table in the second CCPF 1004 will also have a second CCPF2 table state 715 of the example of FIG. 7.

Figure 11:
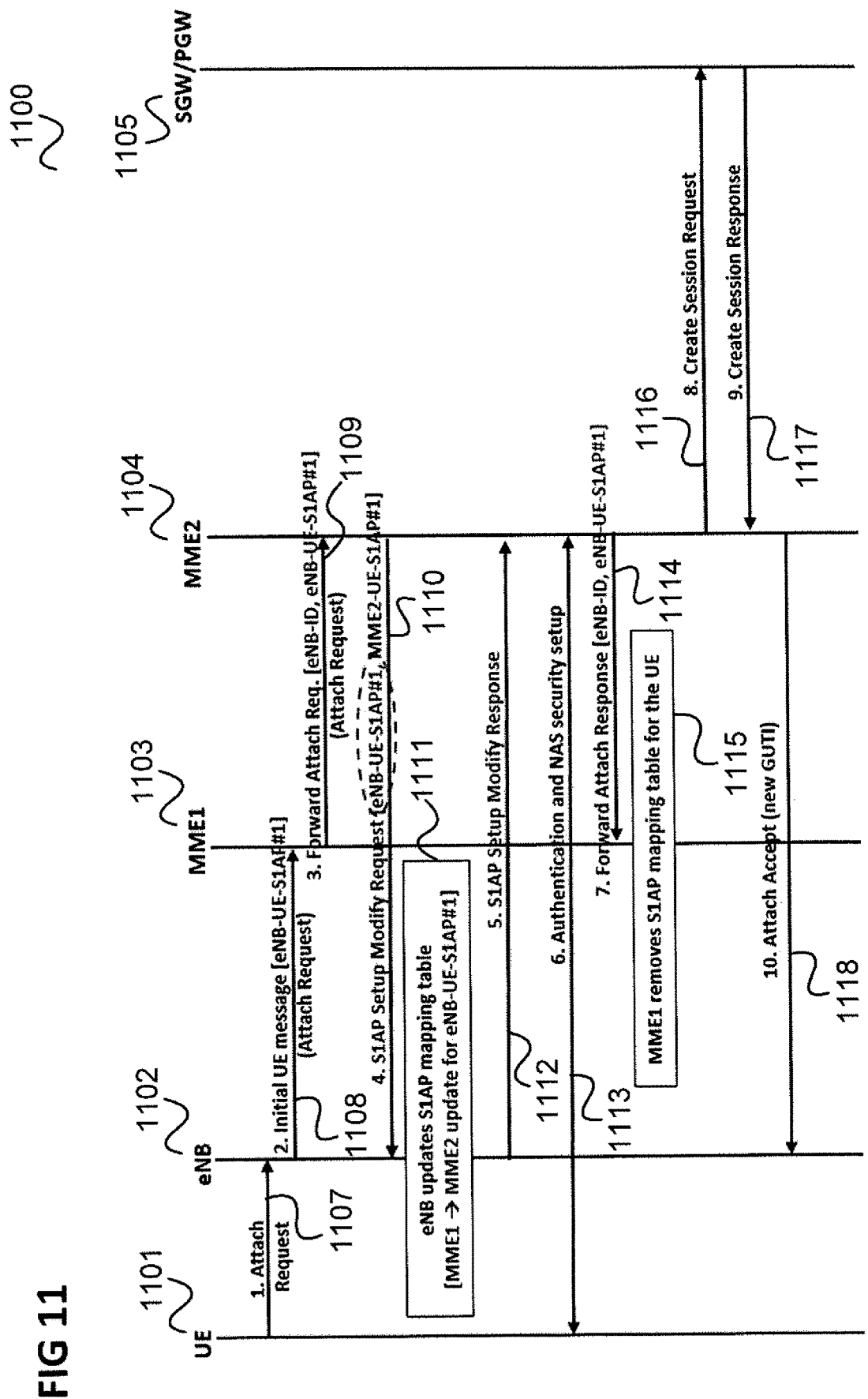
FIG. 11 shows a message flow diagram illustrating an initial attach procedure based on the approach of FIG. 7 in more detail.

FIG. 11 shows a message flow diagram 1100 illustrating an initial attach procedure based on the approach of FIG. 7 in more detail.

The message flow takes place between a UE 1101 corresponding to the UE 305, an eNB 1102 corresponding to the eNB serving UE 301, a default MME 1103 corresponding to the default CCPF 304, a dedicated MME 1104 corresponding to the dedicated CCPF 308, a dedicated SGW or Packet Data Gateway PGW 1105 corresponding to the SGW 309 or the PGW 310.

In 1107, the UE 1101 sends an attach request to the eNB 1102.

In 1108, the eNB 1102 forwards the attach request to the default MME 1103.

In 1109, the default MME 1103 forwards the attach request to the dedicated MME 1104. This may include an identification of the base station 1102 (eNB-ID) and information about the communication session between the base station 1102 and the default MME 1103 (e.g. an identifier eNB-UE-S1AP #1).

In 1110, the dedicated MME 1104 sends an S1AP setup modify request (or S1AP response) to the base station 1102. This includes the information about the communication session between the base station 1102 and the default MME 1103 (eNB-UE-S1AP #1) and information about the new endpoint of the communication session (e.g. an identifier MME2-UE-S1AP #1).

In 1111, in response to the reception of the S1AP setup modify request, the base station updates the S1AP mapping table, i.e. changes the endpoint for eNB-UE-S1AP #1 (which can be seen as session identifier) from the default MME 1103 to the dedicated MME 1104.

In 1112, the base station 1102 (optionally) sends an S1AP setup modify response to the dedicated MME 1104.

In 1113, the dedicated MME 1104 performs authentication and NAS security setup with the UE 1101 (e.g. involving an HSS of the communication network comprising core networks 303, 307 and RAN 302). The NAS security setup includes the negotiation of a key (other than the authentication key) to be used for secure communication between the dedicated MME and the UE.

It shall be noted that the step 1110 can be used to convey the NAS UE authentication request from the dedicated MME, that is performed in step 1113.

In 1114, the dedicated MME 1104 sends a forward attach response to the default MME 1103. This may include the identification of the base station 1102 (eNB-ID) and the information about the communication session between the base station 1102 and the default MME 1103 (e.g. the identifier eNB-UE-S1AP #1).

In 1115, the default MME 1103 removes the S1AP mapping table for the UE 1101.

In 1116, the dedicated MME 1104 sends a create session request to the SGW/PGW 1105 which is answered in 1117.

In 1118, the dedicated MME 1104 sends an attach accept message (including the GUTI) to the eNB 1102 and further parts of the attach procedure may then follow but are not described here.

Figure 12:
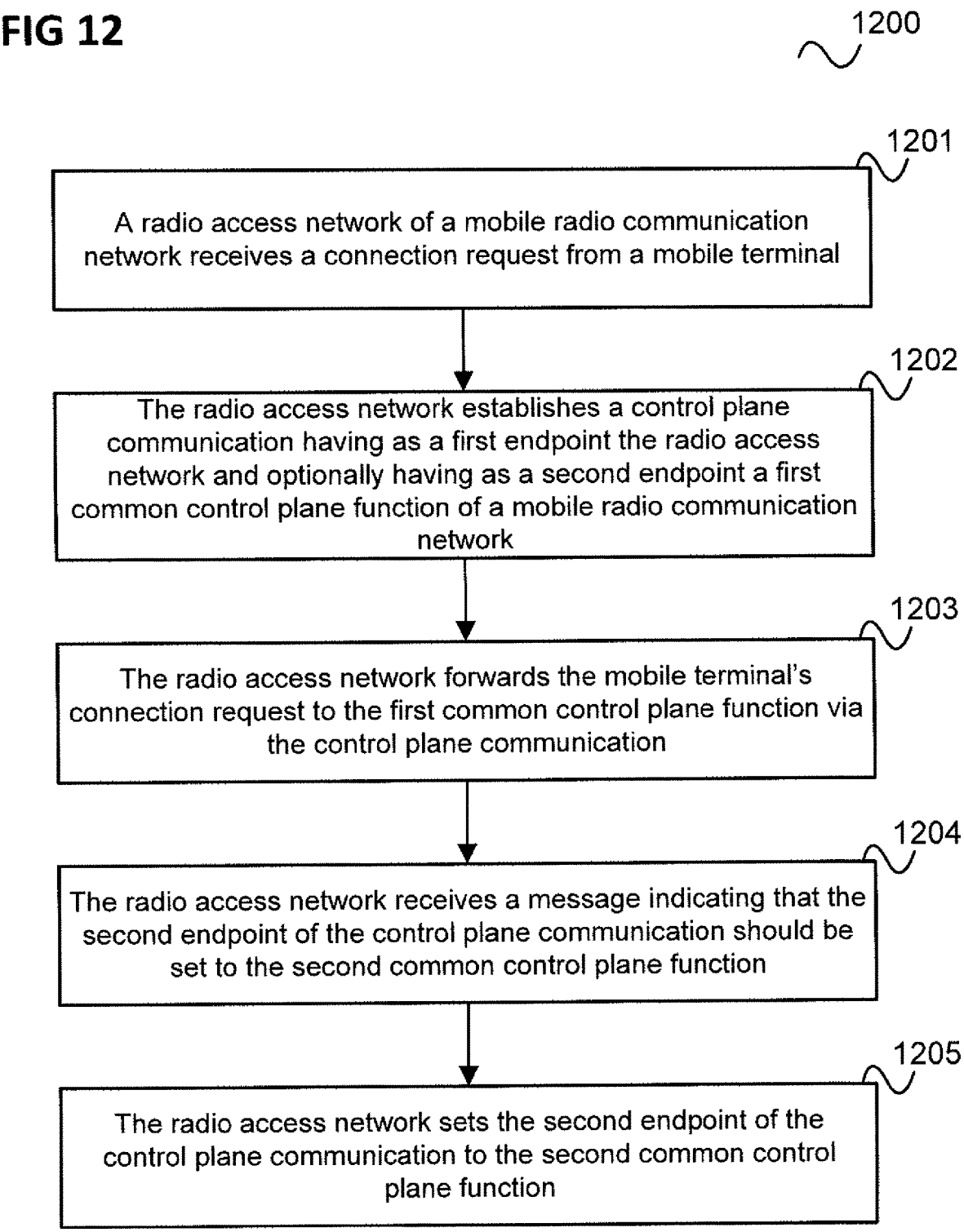
FIG. 12 shows a flow diagram illustrating a method for establishing a connection of a mobile terminal to a mobile radio communication network.

In summary, according to various embodiments, a method for establishing a connection of a mobile terminal to a mobile radio communication network is provided as illustrated in FIG. 12.

FIG. 12 shows a flow diagram 1200.

In 1201, a radio access network of a mobile radio communication network receives a connection request from a mobile terminal.

In 1202, the radio access network establishes a control plane communication having as a first endpoint the radio access network and optionally having as a second endpoint a first common control plane function of a mobile radio communication network.

In 1203, the radio access network forwards the UE's connection request to the first common control plane function via the control plane communication.

In 1204, the radio access network receives a message indicating that the second endpoint of the control plane communication should be set to the second common control plane function. This message can be sent (e.g. via the control plane communication) by the first common control plane function, or by the second common control plane function or by the UE.

In 1205, the radio access network sets the second endpoint of the control plane communication to the second common control plane function.

According to various embodiments, in other words, the radio access network of a mobile radio communication network (e.g. a 5G communication network or an LTE communication network) is informed of a change of (or requested to change) the destination of control plane messages sent from a mobile terminal (i.e. a UE). The message indicating that the second endpoint of the control plane communication should be set to the second common control plane function is for example a control plane message exchanged over the control plane interface between the RAN and the CN (e.g., S1AP message in Evolved Packet System (EPS)), or a control plane message exchanged over the control plane interface between the RAN and the UE (e.g., the RRC (Radio Resource Control) layer message).

For example, during an initial attach procedure, the a dedicated common CP function (e.g. the dedicated MME) may then directly communicate with the RAN after having received the forwarded attach request from the default common CP function (e.g. the default MME). The RAN can for example forward subsequent (e.g. NAS) messages sent by the UE to the dedicated common control plane function.

For example, a signalling may be introduced to update an existing UE's RAN-CN CP session (S1AP) with a new end point (the dedicated common control plane function).

The RAN may thus update an existing RAN/CN CP I/F session without creating new one and the dedicated common CP function may directly communicate with the RAN when it gets a forwarded UE Attach request from the default common CP function.

The control plane communication is for example a communication over a radio access network-core network interface, e.g. based on S1AP.

The term "common" in common control plane function may be understood to refer to the fact that the control plane function is responsible for a plurality of core network instances (or slices), i.e. is common for a plurality of core network instances. In other words, the term "common" in common control plane function is not meant to imply conventional. Further, the term "common control plane function" may be understood to include an MME. In addition, the term "common" in common control plane function may be considered as a plurality of several network functions resided in the core network (e.g., MME that is shared to multiple SGWs in EPC).

The mobile terminal may be authenticated by the first common control plane function or by the second common control plane function. In case the first common control plane function performs the authentication, it may forward the authentication context to the second common control plane function e.g. when it forwards the connection request to the second common control plane function of the mobile radio communication network.

Figure 13:
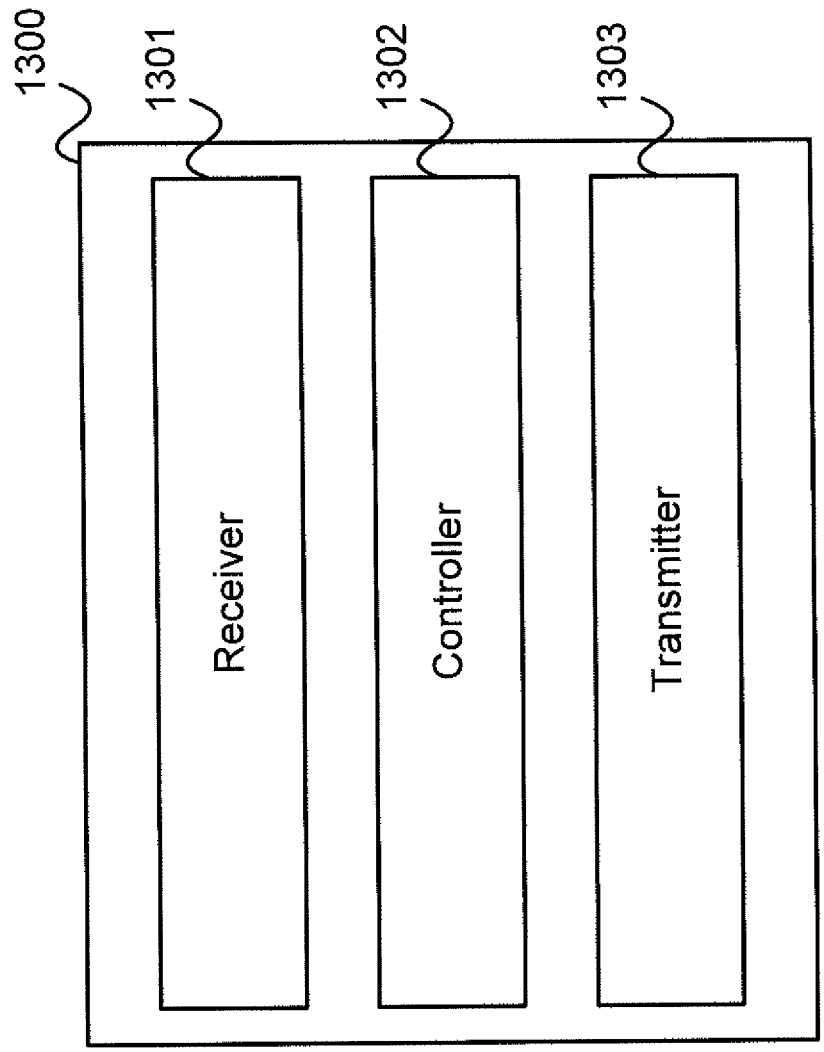
FIG. 13 shows a radio access network component.

The method of FIG. 11 is for example carried out by means of a radio access network component as illustrated in FIG. 13.

FIG. 13 shows a radio access network component 1300.

The radio access network 1300 comprises a receiver 1301 configured to receive a connection request from a mobile terminal and a controller 1302 configured to establish a control plane communication having as a first endpoint the radio access network and optionally having as a second endpoint a first common control plane function of a mobile radio communication network.

The radio access network 1300 further comprises a transmitter 1303 configured to forward the mobile terminal's connection request to the first common control plane function via the control plane communication.

The receiver 1301 is further configured to receive a message indicating that the second endpoint of the control plane communication should be set to the second common control plane function.

The controller 1303 is further configured to set the second endpoint of the control plane communication to the second common control plane function.

Various examples are described below:

Example 1 is a method for establishing a connection of a mobile terminal to a mobile radio communication network is provided as illustrated in FIG. 12.

Example 2 is the method of Example 1, comprising the first common control plane function forwarding the connection request to a second common control plane function of the mobile radio communication network; Example 3 is the method of Example 1, wherein the first common control plane function determines the second common control plane function of the mobile radio communication network by checking a subscription profile of the mobile terminal and forwards the connection request to the second common control plane function.

Example 4 is the method of any one of Examples 1 to 3, further comprising the second control plane function authenticating the mobile terminal via the control plane communication after setting second endpoint of the control plane communication to the second common control plane function.

Example 5 is the method of any one of Examples 1 to 4, further comprising the second control plane function setting up secure control plane communication with the mobile terminal via the control plane communication after setting the second endpoint of the control plane communication to the second common control plane function.

Example 6 is the method of any one of Examples 1 to 5, further comprising establishing a control plane communication session for the mobile terminal via the control plane communication after setting the second endpoint of the control plane communication to the second common control plane function.

Example 7 is the method of any one of Examples 1 to 6, wherein the message indicating that the second endpoint of the control plane communication should be set to the second common control plane function is sent by the second control plane function.

Example 8 is the method of any one of Examples 1 to 6, wherein the message indicating that the second endpoint of the control plane communication should be set to the second common control plane function is sent by the mobile terminal.

Example 9 is the method of any one of Examples 1 to 6, wherein the message indicating that the second endpoint of the control plane communication should be set to the second common control plane function is sent by the first control plane function.

Example 10 is the method of any one of Examples 1 to 9, wherein the message indicating that the second endpoint of the control plane communication should be set to the second common control plane function identifies the second common control plane function as new endpoint of the control plane communication.

Example 11 is the method of any one of Examples 1 to 10, wherein the message indicating that the second endpoint of the control plane communication should be set to the second common control plane function comprises a reference to a communication session that has been used by the radio access network to forward the mobile terminal's connection request to the first common control plane function.

Example 12 is the method of any one of Examples 1 to 11, wherein the radio access network associates the control plane communication with the mobile terminal.

Example 13 is the method of any one of Examples 1 to 12, wherein the radio access network assigns the control plane communication for control plane communication of the mobile terminal.

Example 14 is the method of any one of Examples 1 to 13, wherein setting the second endpoint of the control plane communication to the second common control plane function comprises changing a communication partner of a communication session of the radio access network from the first common control plane function to the second common control plane function.

Example 15 is the method of any one of Examples 1 to 14, wherein the radio access network sends the connection request to the first common control plane function via a communication session between the radio access network and the first common control plane function and wherein setting the second endpoint of the control plane communication to the second common control plane function comprises establishing a communication session between the radio access network and the second common control plane function.

Example 16 is the method of any one of Examples 1 to 15, wherein the radio access network has a memory storing a mapping table which has an entry indicating the second endpoint of the control plane communication.

Example 17 is the method of Example 15, wherein each entry of the mapping table is associated with a communication session and identifies a communication session partner of the radio access network.

Example 18 is the method of Example 16 or 17, wherein setting the second endpoint of the control plane communication to the second common control plane function comprises changing the entry from indicating the first common control plane function to indicating the second common control plane function.

Example 19 is the method of Example 16 or 17, wherein setting the second endpoint of the control plane communication to the second common control plane function comprises adding a second entry to the mapping table indicating the second common control plane function.

Example 20 is a radio access network component as illustrated in FIG. 13.

According to a further example, a communication method between a base station and network CP (control plane) entities in a mobile communication network to manage control plane communication sessions (e.g. RAN-CN I/F CP sessions), e.g. during an initial Attach procedure, is provided. The said network CP entities comprise at least two network CP functions: 1) a first network CP entity, 2) a second network CP entity. The first network CP entity is a default network CP entity or a network CP entity that first receives the Attach request from the UE forwarded by the RAN, and the second network CP entity is a dedicated network CP entity that is assigned for serving a specific UE or a specific service. The communication method comprises A radio access network (RAN) receives an UE Attach request from the UE to attach to the mobile communication network The RAN forwards the UE Attach request by setting up a first session over the RAN-CN I/F (RAN-core network interface) with the first network CP function The first network CP function determines which core network or NW slice is appropriate for the UE by taking the UE's subscription profile into account The first network CP function forwards the UE attach request to the second network CP function (without going via the RAN). The forwarded message contains the information related to the said first session between the RAN and the first network CP entity The second network CP function sends a Attach response to the UE via the RAN. The communication between the second network CP function and the RAN is done by using the CP signalling to the RAN. The CP signalling to the RAN contains an information about updating the contact point of the first session with the second network CP function. The said CP signalling includes the said first session between the RAN and the first network CP entity.

Alternatively, the second network CP function may send a response to the first network CP function, and the first network CP function may send an Attach response to the UE via the RAN. In this case, the communication between the first network CP function and the RAN is done by using the CP signalling to the RAN over the first session. Along with this Attach response sent by the first network CP function, the CP signalling to the RAN also carries an information about change of the contact point of CP function in the core network. This information can be an identification of the second network CP function or a new endpoint of the first session that belongs to the second network CP function.

Another alternative is that the first network CP function may send the Attach accept to the UE via the RAN with no new information about the new endpoint of the first session that belongs to the second network CP function. In this case, when the UE sends any subsequent messages to the CN via the RAN, these subsequent messages contains an information that allows the RAN to be aware of the change of the contact point of CP function in the core network specific for this UE. This information can be an identification of the second network CP function. The RAN will either update/modify the (existing) first session with the new contact point of the network CP function in the core network or set up a new session with the new contact point of the network CP function in the core network and release the (existing) first session.

It should be noted that embodiments and examples described in context of one of the methods are analogously valid for the radio access network component and vice versa.

The components of the radio access network (e.g. the receiver, the controller and the transmitter) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A method for establishing a connection of a mobile terminal to a mobile radio communication network comprising:
   a radio access network of the mobile radio communication network receiving a connection request from the mobile terminal;
   the radio access network establishing a control plane communication having as a first endpoint the radio access network;
   the radio access network forwarding the mobile terminal's connection request to a first common control plane function via the control plane communication;
   the first common control plane function directly forwarding the connection request to a second common control plane function;
   the radio access network receiving a message indicating that a second endpoint of the control plane communication should be set to the second common control plane function; and
   the radio access network setting the second endpoint of the control plane communication to the second common control plane function,
   wherein the message indicating that the second endpoint of the control plane communication should be set to the second common control plane function identifies the second common control plane function as a new endpoint of the control plane communication,
   wherein the connection request is a request to establish a connection between the mobile terminal and the mobile radio communication network, and
   wherein the second common control plane function authenticates the mobile terminal via the control plane communication after setting the second endpoint of the control plane communication to the second common control plane function.

2. The method of claim 1, further comprising the second common control plane function transmitting an application protocol setup modify request to the radio access network, the application protocol setup modify request comprising:
   information about the radio access network and the first common control plane function, and an identifier of the second common control plane function.

3. The method of claim 2, further comprising the second control plane function setting up a secure control plane communication with the mobile terminal via the control plane communication after setting the second endpoint of the control plane communication to the second common control plane function.

4. The method of claim 1, wherein the first common control plane function determines the second common control plane function of the mobile radio communication network by checking a subscription profile of the mobile terminal.

5. The method of claim 4, further comprising the second control plane function setting up a secure control plane communication with the mobile terminal via the control plane communication after setting the second endpoint of the control plane communication to the second common control plane function.

6. The method of claim 1, further comprising the second control plane function setting up a secure control plane communication with the mobile terminal via the control plane communication after setting the second endpoint of the control plane communication to the second common control plane function.

7. The method of claim 1, further comprising establishing a control plane communication session for the mobile terminal via the control plane communication after setting the second endpoint of the control plane communication to the second common control plane function.

8. The method of claim 1, wherein the message indicating that the second endpoint of the control plane communication should be set to the second common control plane function is sent by the second control plane function.

9. The method of claim 1, wherein the message indicating that the second endpoint of the control plane communication should be set to the second common control plane function is sent by the mobile terminal.

10. The method of claim 1, wherein the message indicating that the second endpoint of the control plane communication should be set to the second common control plane function is sent by the first control plane function.

11. The method of claim 1, wherein the message indicating that the second endpoint of the control plane communication should be set to the second common control plane function comprises a reference to a communication session that has been used by the radio access network to forward the mobile terminal's connection request to the first common control plane function.

12. The method of claim 1, wherein the radio access network associates the control plane communication with the mobile terminal.

13. The method of claim 1, wherein the radio access network assigns the control plane communication for the mobile terminal.

14. The method of claim 1, wherein setting the second endpoint of the control plane communication to the second common control plane function comprises changing a communication partner of a communication session of the radio access network from the first common control plane function to the second common control plane function.

15. A radio access network component comprising:
- a receiver configured to receive a connection request from a mobile terminal;
- a controller configured to establish a control plane communication having as a first endpoint the radio access network; and
- a transmitter configured to forward the mobile terminal's connection request to a first common control plane function via the control plane communication;
- wherein the controller is configured to directly forward the connection request from the first common control plane function to a second common control plane function;
- wherein the receiver is configured to receive a message indicating that a second endpoint of the control plane communication should be set to the second common control plane function;
- wherein the controller is configured to set the second endpoint of the control plane communication to the second common control plane function,
- wherein the message indicating that the second endpoint of the control plane communication should be set to the second common control plane function identifies the second common control plane function as a new endpoint of the control plane communication,
- wherein the connection request is a request to establish a connection between the mobile terminal and a mobile radio communication network, and
- wherein the second common control plane function authenticates the mobile terminal via the control plane communication after setting the second endpoint of the control plane communication to the second common control plane function.

* * * * *